United States Patent
Park et al.

(10) Patent No.: US 8,929,339 B2
(45) Date of Patent: Jan. 6, 2015

(54) M2M DEVICE WHICH PERFORMS COMMUNICATION DURING NETWORK ENTRY AND HANDOVER, AND CORRESPONDING METHOD FOR PERFORMING COMMUNICATION

(75) Inventors: Kyujin Park, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 221 days.

(21) Appl. No.: 13/696,008

(22) PCT Filed: May 4, 2011

(86) PCT No.: PCT/KR2011/003332
§ 371 (c)(1),
(2), (4) Date: Nov. 2, 2012

(87) PCT Pub. No.: WO2011/139087
PCT Pub. Date: Nov. 10, 2011

(65) Prior Publication Data
US 2013/0058311 A1 Mar. 7, 2013

Related U.S. Application Data

(60) Provisional application No. 61/330,899, filed on May 4, 2010, provisional application No. 61/333,222, filed on May 10, 2010.

(51) Int. Cl.
*H04W 72/04* (2009.01)
*H04W 36/00* (2009.01)
*H04W 92/10* (2009.01)
*H04W 4/00* (2009.01)

(52) U.S. Cl.
CPC .......... *H04W 36/0033* (2013.01); *H04W 92/10* (2013.01); *H04W 4/005* (2013.01)
USPC ......................................... 370/331

(58) Field of Classification Search
CPC .. H04W 36/0033; H04W 4/005; H04W 92/10
USPC ................................. 370/310, 328, 329, 331
See application file for complete search history.

(56) References Cited

U.S. PATENT DOCUMENTS 7,430,418 B2 *  9/2008  Kang et al. .................... 455/436
8,031,679 B2 * 10/2011  Shaik et al. ................... 370/334

(Continued)

FOREIGN PATENT DOCUMENTS

KR     1020020046668     6/2002

OTHER PUBLICATIONS

PCT International Application No. PCT/KR2011/003332, Written Opinion of the International Searching Authority, dated Jan. 19, 2012, 17 pages.

*Primary Examiner* — Chih H Pham
*Assistant Examiner* — Robert Lopata
(74) *Attorney, Agent, or Firm* — Lee, Hong, Degerman, Kang & Waimey (57) ABSTRACT

Disclosed is a machine to machine (M2M) device which performs communication during both network entry and handover, and a corresponding method for performing communication. The M2M device which performs communication during handover according to one embodiment of the present invention comprises a receiver and a transmitter, wherein the receiver receives, from a serving base station, a first message containing information on M2M features or M2M requirements supported by at least one neighbor base station or neighbor cell, and the transmitter transmits, to the serving base station, a second message containing information for requesting the support of M2M features or M2M requirements necessary for the M2M device based on the first message.

7 Claims, 5 Drawing Sheets

(56) References Cited

U.S. PATENT DOCUMENTS

| | | | |
|---|---|---|---|
| 8,036,225 B1 * | 10/2011 | Pawar et al. | 370/395.21 |
| 8,126,462 B2 * | 2/2012 | Thakare | 455/436 |
| 8,134,982 B2 * | 3/2012 | Lee et al. | 370/335 |
| 8,175,631 B2 * | 5/2012 | Kodama | 455/550.1 |
| 8,219,090 B2 * | 7/2012 | Hosain et al. | 455/435.2 |
| 8,259,678 B2 * | 9/2012 | Jung et al. | 370/331 |
| 8,346,283 B2 * | 1/2013 | Cha et al. | 455/456.2 |
| 8,401,096 B2 * | 3/2013 | Raif et al. | 375/260 |
| 8,442,539 B2 * | 5/2013 | Li et al. | 455/444 |
| 8,477,717 B2 * | 7/2013 | Kojima | 370/331 |
| 8,520,635 B2 * | 8/2013 | Zhang et al. | 370/331 |
| 8,706,117 B2 * | 4/2014 | Shi et al. | 455/436 |
| 8,718,013 B2 * | 5/2014 | Yang et al. | 370/331 |
| 8,737,989 B2 * | 5/2014 | Luft | 455/432.3 |
| 2005/0232212 A1 | 10/2005 | Kang et al. | |
| 2008/0293415 A1 | 11/2008 | Fan | |
| 2009/0111470 A1 * | 4/2009 | Thakare | 455/436 |
| 2009/0161616 A1 * | 6/2009 | Ramesh et al. | 370/329 |
| 2009/0191858 A1 | 7/2009 | Calisti et al. | |
| 2009/0252116 A1 * | 10/2009 | von Brandt et al. | 370/331 |
| 2009/0296659 A1 * | 12/2009 | Lim et al. | 370/331 |
| 2011/0164592 A1 * | 7/2011 | Liu et al. | 370/331 |
| 2011/0170519 A1 * | 7/2011 | Zhang et al. | 370/331 |
| 2011/0199905 A1 * | 8/2011 | Pinheiro et al. | 370/235 |
| 2011/0213871 A1 * | 9/2011 | DiGirolamo et al. | 709/223 |
| 2011/0223942 A1 * | 9/2011 | Xu et al. | 455/458 |
| 2011/0228750 A1 * | 9/2011 | Tomici et al. | 370/338 |
| 2011/0264740 A1 * | 10/2011 | Diachina et al. | 709/204 |
| 2012/0264451 A1 * | 10/2012 | Kim et al. | 455/456.1 |
| 2013/0010646 A1 * | 1/2013 | Liu et al. | 370/255 |
| 2013/0029716 A1 * | 1/2013 | Lee et al. | 455/519 |
| 2013/0040680 A1 * | 2/2013 | Kim et al. | 455/509 |
| 2013/0188515 A1 * | 7/2013 | Pinheiro et al. | 370/254 |

* cited by examiner

M2M DEVICE WHICH PERFORMS COMMUNICATION DURING NETWORK ENTRY AND HANDOVER, AND CORRESPONDING METHOD FOR PERFORMING COMMUNICATION

CROSS-REFERENCE TO RELATED APPLICATIONS

This application is the National Stage filing under 35 U.S.C. 371 of International Application No. PCT/KR2011/003332, filed on May 4, 2011, which claims the benefit of U.S. Provisional Application Ser. No. 61/330,899, filed on May 4, 2010, and U.S. Provisional Application Ser. No. 61/333,222, filed on May 10, 2010, the contents of which are all hereby incorporated by reference herein in their entirety.

TECHNICAL FIELD

The present invention relates to mobile communication, and more particularly, to an M2M device for performing communication during a network entry and handover of a mobile communication system, and a method for performing the communication.

BACKGROUND ART

The term "machine to machine (M2M) communication" refers to communication that is performed between electronic devices. Although, in a broad sense, the term "M2M communication" refers to wired or wireless communication between electronic devices or communication between a device that is controlled by a human and a machine, the term has generally been used recently to indicate wireless communication between electronic devices, i.e., wireless communication between devices.

In the early 1990's when the M2M communication concept was introduced, M2M was considered a concept such as remote control or telematics and associated markets were greatly limited. However, in recent years, M2M communication has been continuously rapidly developed to create a new market that is attracting domestic and global attention. Especially, M2M communication has exerted a great influence upon fields such as Point Of Sale (POS) and fleet management in the security-related application market and a smart meter for automatically measuring the amount of consumed heat or electricity, measuring an operating time of construction equipment and facilities, and remote monitoring machines and facilities. In the future, M2M communication will be used for a wider variety of purposes, in combination with existing mobile communication and wireless high-speed Internet or low-power communication solutions such as Wi-Fi and Zig-Bee, and will no longer be limited to the B2B market, expanding into a B2C market.

In the M2M communication era, all machines equipped with a SIM card can transmit and receive data such that it is possible to remotely manage and control all such machines. For example, the application range of M2M communication technology is very broad such that M2M communication technology can be used for a great number of devices and equipment such as cars, trucks, trains, containers, vending machines, and gas tanks.

Human type communication (HTC) devices (e.g., mobile terminals) have been generally managed in individual units, and thus communication between a base station (BS) and a mobile station (MS) has been one to one communication. In such an environment, when considering numerous M2M terminals, it is expected that the network would be overloaded due to signaling generated between each of the individual M2M terminals and the base station. As stated above, when M2M communication is rapidly distributed and widely used, overhead due to communication between M2M terminals or communication between M2M terminals and the base station may become a problem.

Further, in a communication environment between an HTC device and a base station, as an M2M device is introduced and the M2M device also performs communication, there is a need for distinguishing the HTC device from the M2M device, and in a situation in which various M2M devices exist according to the application type, there is a need for discussing, with the base station, M2M requirements or features according to the application of the M2M device. However, up to now, no specific solution regarding how to distinguish a HTC device from an M2M device and how to discuss M2M features or requirements has been suggested.

DISCLOSURE

Technical Problem

An object of the present invention devised to solve the problem lies in providing a method for performing, by a machine to machine (M2M) device, communication during a network entry.

Another object of the present invention devised to solve the problem lies in providing a method for performing, by an M2M device, communication during handover.

Another object of the present invention devised to solve the problem lies in providing an M2M device for performing communication during a network entry.

Another object of the present invention devised to solve the problem lies in providing an M2M device for performing communication during handover.

Technical Solution

An object of the present invention can be achieved by providing a method for performing communication by a machine to machine (M2M) device during a network entry including transmitting, by the M2M device, a signal to a base station through an M2M dedicated ranging resource which is distinguished from a ranging resource allocated to a human type communication (HTC) device. The method may further comprise receiving information on the M2M dedicated ranging resource from the base station. Here, the M2M dedicated ranging resource is distinguished from the ranging resource allocated to the HTC device in a time divisional multiplexing scheme, a frequency division multiplexing scheme or a code division multiplexing scheme. Further, the information on the M2M dedicated ranging resource includes at least one of a time unit offset value and a frequency unit offset value of the M2M dedicated ranging resource on the ranging resource allocated to the HTC device, and a cyclic shift offset value of a seed sequence used in generating a ranging code of the HTC device. The method may further include transmitting a first message including information of requesting support of M2M features or M2M requirements according to an application type of the M2M device, and receiving a second message including information on the M2M features or M2M requirements according to the application type of the M2M device, which may be supported by the base station, as a response to the first message. Further, the method may further include receiving, from a base station, M2M dedicated system information including information on M2M features or M2M requirements according to an application type of an M2M device, which may be supported by the base station, and transmitting, to the base station, information on M2M features or M2M requirements requested by the M2M device on the basis of the M2M dedicated system information.

In another aspect of the present invention, provided herein is a method for performing communication by a machine to machine (M2M) device during a handover including transmitting, to a serving base station, a first message which requests support of M2M features or M2M requirements according to an application type of the M2M device, and receiving, from the serving base station, a second message including information on M2M features or M2M requirements supportable by the target base station, which the serving base station has received from the target base station as feedback. The first message may be an M2M dedicated MAC message type or an AAI-RNG-REQ message type, and the second message may be an M2M dedicated MAC message type or an AAI-HO-CMD message type.

In another aspect of the present invention, provided herein is a method for performing communication by a machine to machine (M2M) device during handover including receiving, from a serving base station, a first message including information on M2M features or M2M requirements which are supported by at least one neighbor base station or neighbor cell, and transmitting, to the serving base station, a second message including information of requesting support of M2M features or M2M requirements which are necessary to the M2M device, on the basis of the first message. The method may further include receiving, from a target base station, a third message including information indicating whether the requested M2M features or M2M requirements are supported. Here, the first message may be an AAI-NBR-ADV message type, and the second message may be an AAI-HO-IND message type or an AAI-HO-REQ message type. Further, the third message may be an M2M dedicated MAC management message type or an AAI-RNG-RSP message type.

In another aspect of the present invention, provided herein is a machine to machine (M2M) device for performing communication during a network entry including a transmitter configured to transmit a signal to a base station through an M2M dedicated ranging resource which is distinguished from a ranging resource allocated to a human type communication (HTC) device. The M2M device may further include a receiver configured for receive information the M2M dedicated ranging resource from the base station. The transmitter is further configured to transmit a first message including information of requesting support of M2M features or M2M requirements according to an application type of the M2M device, and the receiver is further configured to receive a second message including information on the M2M features or M2M requirements according to the application type of the M2M device, which may be supported by the base station, as a response to the first message. Optionally, the receiver receives, from a base station, M2M dedicated system information including information on M2M features or M2M requirements according to an application type of an M2M device, which may be supported by the base station, and the transmitter transmits, to the base station, information on M2M features or M2M requirements requested by the M2M device on the basis of the M2M dedicated system information.

In another aspect of the present invention, provided herein is a machine to machine (M2M) device for performing communication during a handover including a receiver for receiving, from a serving base station, a first message including information on M2M features or M2M requirements which are supported by at least one neighbor base station or neighbor cell, and a transmitter for transmitting, to the serving base station, a second message including information of requesting support of M2M features or M2M requirements which are necessary to the M2M device, on the basis of the first message.

Advantageous Effects

According to various embodiments of the present invention, communication of M2M devices may be supported through distinction with HTC devices and division according to the application type of M2M devices in the existing mobile communication system.

Further, communication of M2M devices in the case of an initial network entry or handover of the existing mobile communication system may be efficiently supported.

The effects of the present invention are not limited to the effects mentioned above, and other effects will be clearly understood by those skilled in the art from the disclosure below.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or shown in block diagram form, focusing on important features of the structures and devices, so as not to obscure the concept of the present invention. The same reference numbers will be used throughout this specification to refer to the same or like parts.

Figure 1:
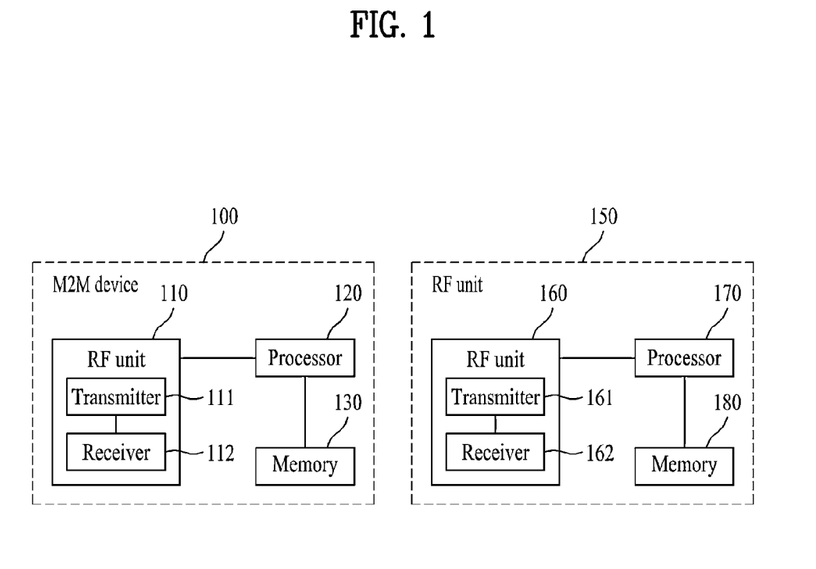
FIG. 1 illustrates a configuration of an M2M device and a base station according to an embodiment of the present invention.

FIG. 1 illustrates a configuration of an M2M device and a base station according to an embodiment of the present invention.

As shown in FIG. 1, the M2M device 100 and the base station 150 may include RF units 110 and 160, processors 120 and 170, and memories 130 and 180, respectively. The RF units 110 and 160 may include transmitters 111 and 161 and receivers 112 and 162, respectively. The transmitter 111 and the receiver 112 of the M2M device 100 may be configured so as to transmit and receive signals to and from the base station 150 and other M2M devices and the processor 120 may be functionally connected to the transmitter 111 and the receiver 112 so as to control processes which the transmitter 111 and the receiver 112 perform to transmit and receive signals to and from other devices. The processor 120 may transmit a signal to the transmitter 111 after performing a variety of processes upon the signal and may process a signal received by the receiver 112. When needed, the processor 120 may store information included in an exchanged message in the memory 130. Using such a structure, the M2M device 100 can perform methods according to various embodiments described below.

Although not illustrated in FIG. 1, the M2M device 100 may include various additional components according to the type of application. When the M2M device 100 is an M2M device for smart measurement, the M2M device 100 may include an additional component for power measurement or the like and such a power measurement operation may be controlled by the processor 120 shown in FIG. 1 or by a separate processor (not shown).

Although FIG. 1 illustrates the case in which communication is performed between the M2M device 100 and the base station 150, M2M communication methods according to the present invention may be performed between M2M devices and each of the devices may have the same configuration as that shown in FIG. 1 and perform methods according to various embodiments described below.

The transmitter 161 and the receiver 162 of the base station 150 may be configured so as to transmit and receive signals to and from another base station, an M2M server, and M2M devices and the processor 170 may be functionally connected to the transmitter 161 and the receiver 162 so as to control processes which the transmitter 161 and the receiver 162 perform to transmit and receive signals to and from other devices. The processor 170 may transmit a signal to the transmitter 161 after performing a variety of processes upon the signal and may process a signal received by the receiver 162. When needed, the processor 170 may store information included in an exchanged message in the memory 180. Using such a structure, the base station 150 can perform methods according to various embodiments described below.

The processors 120 and 170 of the RF unit 110 and the base station 150 instruct (for example, control, adjust, or manage) operations of the RF unit 110 and the base station 150, respectively. The processors 120 and 170 may be connected to the memories 130 and 180 that store program code and data. The memories 130 and 180 are connected to the processors 120 and 170 and store operating systems, applications, and general files, respectively.

Each of the processors 120 and 170 may also be referred to as a controller, a microcontroller, a microprocessor, or a microcomputer. Each of the processors 120 and 170 may be implemented by hardware, firmware, software, or any combination thereof. In the case in which the embodiments of the present invention are implemented by hardware, the processors 120 and 170 may include application specific integrated circuits (ASICs), digital signal processors (DSPs), digital signal processing devices (DSPDs), programmable logic devices (PLDs), field programmable gate arrays (FPGAs), processors, controllers, microprocessors, or the like.

In the case in which the embodiments of the present invention are implemented by firmware or software, the firmware or software may be configured so as to include modules, processes, functions, or the like which perform the features or operations of the present invention and the firmware or software configured so as to implement the present invention may be provided in the processors 120 and 170 or may be stored in the memories 130 and 180 so as to be executed by the processors 120 and 170.

The number of M2M devices in a network will gradually increase as the number of machine application types increases. Such machine application types that are under discussion include, but are not limited to, (1) security, (2) public safety, (3) tracking and tracing, (4) payment, (5) healthcare, (6) remote maintenance and control, (7) metering, (8) consumer devices, (9) Point Of Sale (POS) and fleet management in the security-related application market, (10) communication between vending machines, (11) a smart meter for automatically measuring the amount of consumed heat or electricity, measuring an operating time of construction equipment and facilities, and remote monitoring machines and facilities, and (12) surveillance video communication of a surveillance camera, and various other machine application types are also under discussion.

The above described M2M device has features and requirements according to the type of application. Hereinafter, features and requirements of a general M2M device will be briefly considered. An M2M device should consume power as low as possible, communication with high reliability is required, the access priority for the network should be enhanced, and many M2M devices should successfully perform simultaneous transmission to the network. Further, in order to support such many M2M devices, the system should be able to address many M2M devices as an individual device or a group of devices, and the group management of M2M devices may be necessary. Further, the security requirements may be strengthened with respect to the M2M devices. Further, the M2M device should also support a small data size (e.g., data less than 140 bytes).

Further, the M2M device with little or no mobility should also be supported. Time-controlled operation and time-tolerant operation are required. One-way data transmission, extremely low latency, and extremely long range access are required. Transmission at infrequent transmission intervals should also be supported. Up to now, examples on features (functions) and requirements, which are necessary for a general M2M device, have been described, but the present invention is not limited thereto.

Figure 2:
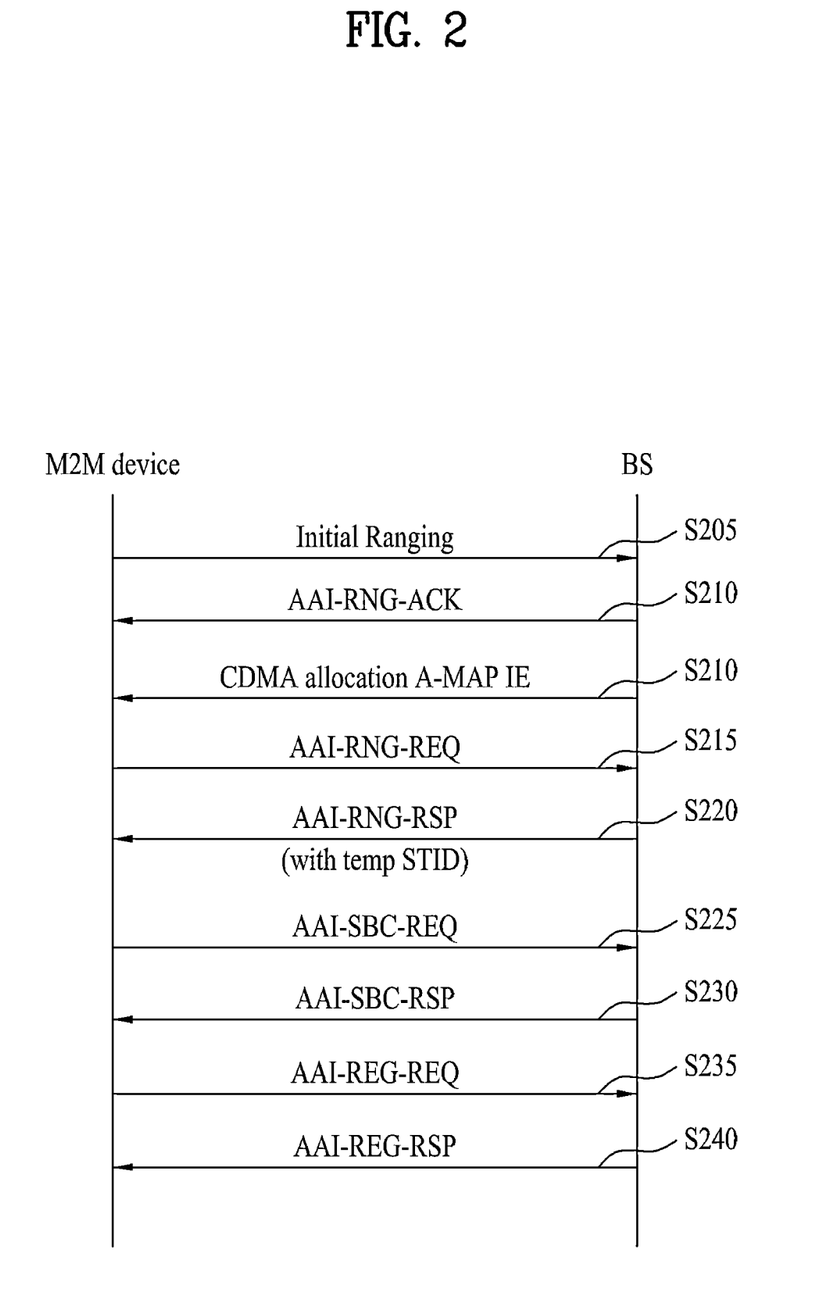
FIG. 2 illustrates a process of performing, by an HTC device, an initial network entry.

FIG. 2 illustrates a process of performing, by an HTC device, an initial network entry.

Referring to FIG. 2, a human type communication device (e.g., a mobile terminal, etc.) transmits initial ranging to the base station (S205). The initial ranging is a process in which the HTC device obtains the accurate timing offset with the base station, and adjusts the transmission power at the initial period. Generally, when the power of the HTC device is turned on, the HTC device obtains the downlink synchronization using the downlink preamble signal received from the base station. Thereafter, the HTC device performs initial ranging so as to adjust the uplink timing offset and transmission power. The HTC device selects the ranging preamble code from the initial ranging domain after selecting a ranging channel, and transmits the ranging preamble code selected as the base station through the selected ranging channel (S205).

Thereafter, the base station may transmit a reception acknowledgement message (e.g., AAI-RNG-ACK message) on the initial ranging of the HTC device to the HTC device (S210). The AAI-RNG-ACK message provides an acknowledgement that all of ranging preamble codes have been successfully received and detected in all ranging opportunities.

The base station may include three possible ranging statuses for the initial ranging in the AAI-RNG-ACK message, and transmit the message to the HTC device. Here, three possible ranging statuses included in the AAI-RNG-ACK message are "continue" status, "success" status, and "abort" status.

In step S210, the base station may transmit a CDMA allocation A-MAP IE message to inform the HTC device of information which is necessary for transmission of the AAI-RNG-REQ message instead of the AAI-RNG-ACK message to the HTC device.

Thereafter, the HTC device may transmit a message (e.g., AAI-RNG-REQ message), which requests ranging to the base station, through the allocated resources (S215). Then the base station transmits, to the HTC device, the message which confirms reception of the ranging request message (S220). In the case of a system to which the HARQ operation is applied, the HTC device may transmit, to the base station, a message (e.g., AAI-SBC-REQ message), which requests basic capability, in order to discuss the capability (S225). As a response to reception of the AAI-SBC-REQ message, the message (e.g., AAI-SBC-RSP message), which confirms the reception of the AAI-SBC-REQ message, may be transmitted to the HTC device (S230).

Further, the HTC device may transmit, to the base station, a message (e.g., an AAI-REG-REQ message) for capability negotiation and registration to the network at the time of the network entry (S235), and in response to the reception of the AAI-REG-REQ message, the base station may transmit, to the HTC device, a message (e.g., an AAI-REG-RSP message), which confirms the reception of the AAI-REG-REQ message (S240). The HTC device completes the entry of the network to which the base station belongs by performing such a series of processes.

The existing wireless communication system has been designed in a direction to optimize resources for HTC devices. However, recently, the M2M or MTC communication method, in which communication is performed between devices or between a device and a device server automatically without intervention of a person, is appearing as a new communication paradigm. As such, efforts for optimizing the support for M2M devices along with the existing HTC devices are being made in IEEE 802.16 system, which is an example of a mobile communication system, and a wide area network (WAN) system of a 3GPP LTE group.

The present invention suggests ideas about the network entry process and capability negotiation for M2M devices in order to apply M2M requires and/or features according to the usage model or application of M2M devices in a cell-based wireless communication system such as IEEE 802.16 system, 3GPP LTE, LTA-A system, tec.

<How to Distinguish HTC Device from M2M Device>

As mentioned above, M2M devices may have various requirements and features according to the usage model and application type. As a first step for applying M2M device specific M2M requirements and features, it is necessary to distinguish M2M devices from HTC devices. The present invention suggests two methods for distinguishing HTC devices from M2M devices.

1. Distinguishing Method Through Ranging Resource Separation Between M2M Devices and HTC Devices.

The first method for distinguishing an M2M device from a HTC device is to distinguish ranging resources used by the M2M device from ranging resources used by the HTC device. The ranging resources may be allocated through system information which is broadcast by the base station. For example, in the case of IEEE 802.16m system, the base station may allocate the ranging code and time/frequency resources to the HTC device through the secondary-superframe header (S-SFH). As another example, in the case of 3GPP LTE-A, LTE-A system, the base station may configure the RACH through the system information block (SIB), and allocate the RACH to the HTC device.

The base station may allocate additional M2M-dedicated ranging resources for M2M devices in addition to the existing ranging resources which are allocated through the system information. Then the M2M device just needs to proceed with the ranging procedure with the base station only through the M2M-dedicated ranging resources.

The base station may explicitly signal information on the allocation of the M2M dedicated ranging resources to the M2M device, but it is possible to signal such information so that the M2M device implicitly recognize the information. Hereinafter, the methods of explicitly signaling such information and implicitly signaling such information will be specifically described.

(1) Method of Explicitly Signaling M2M Dedicated Ranging Resource Information

The base station may transmit M2M dedicated ranging resource information through new system information defined for only M2M devices, or may transmit M2M dedicated ranging resource information using the reserved field of the already existing system information. The base station may define new system information for only M2M devices, and transmit the newly defined system information to M2M devices at fixed intervals through fixed resources. Further, the base station may define the system information identifier (ID) for only M2M devices in the existing system information, perform CRC masking with the defined system information ID, and transmit the M2M dedicated ranging resource information through A-MAP-IE (or PDCCH). Further, the base station may define a station identifier (STID) for M2M devices, perform CRC masking with the M2M dedicated STID and transmit M2M dedicated ranging resource information to M2M devices through A-MAP-IE (or PDCCH).

The base station may transmit, to M2M devices, other system information which is necessary according to the application type of an M2M device (e.g., information on whether it is possible to support M2M features/requirements) in addition to the M2M dedicated ranging resource information. The M2M device may receive M2M dedicated system information without receiving the existing system information for HTC devices, or may receive the existing system information for HTC devices and additionally receive M2M dedicated system information. In this case, M2M devices may utilize both the existing ranging resources for the HTC devices and the ranging resources for the M2M devices.

Likewise, in the case in which the base station explicitly signals M2M dedicated ranging resource information to the M2M device through the M2M dedicated system information to allocate the resources, the base station may transmit information on the allocated ranging code and ranging time/frequency resources as an entire set, or may transmit, to the M2M devices, information on the M2M dedicated resources in a manner that provides the offset value on the already allocated ranging resources. That is, in the case in which the base station allocates M2M dedicated ranging resources in an offset form for ranging resources already allocated for the HTC devices, the base station may allocate M2M dedicated ranging resources in a time division multiplexing (TDM) form as allocating in different time units (e.g., different subframes or different symbols, etc.) in the same frequency position as that of the ranging resources allocated for the existing HTC devices. In this case, the type of the offset value in the time domain may be expressed as the offset value of the number of the subframes, the number of the symbols or the number of frames.

The base station may allocate the ranging resources of the existing HTC devices and the M2M dedicated ranging resources in a frequency division multiplexing (FDM) form as in allocating the resources to different frequency resources in the same subframe or symbol. In this case, the frequency domain offset value may be the offset value of a resource block (RB), a physical resource unit (PRU), and a logical resource unit (LRU), or may be of an offset value form which is a multiple of a PRU such as a subband.

Further, the base station may orthogonally allocate M2M dedicated ranging resources in the ranging resources and code domain for the existing HTC devices, and may perform broadcasting for M2M devices. In this case, the base station may transmit, to M2M devices, the ranging code seed sequence which is different from the ranging code for HTC devices, may directly transmit, to M2M devices, different cyclic shift values, or may transmit, to M2M devices, the offset value for the seed sequence and the cyclic shift for generation of the already allocated ranging code of the HTC devices.

(2) Method of Implicitly Allocating M2M Dedicated Ranging Resources

As described above, the base station may allocate M2M dedicated ranging resources for M2M devices and explicitly signal the resources to the M2M devices. Further, although the base station does not explicitly signal the M2M dedicated ranging resources to the M2M devices, the base station may allow the M2M devices to implicitly recognize the M2M dedicated ranging resource information.

To this end, as in the case in which the M2M dedicated ranging resources are set and allocated by the above described explicit signaling method, the M2M dedicated ranging resources may be allocated in the TDM or FDM form with the offset value given for the ranging resources for already allocated HTD devices, or the ranging resources may be allocated in the code division multiplexing (CDM) scheme in the code area by generating the ranging cod with the constant offset while using the same time/frequency ranging resources. In this case, the offset value is a predefined value, and may be information mutually shared by the base station and the M2M device. Hence, the processor 120 of the M2M device may recognize the M2M dedicated ranging resources on the basis of the already allocated ranging resource information for HTC devices along with the offset value which has been predetermined and already recognized.

The above description explains how to distinguish an HTC device from an M2M device, but the above description may also be applied to a method of allocating each M2M dedicated ranging resource for several M2M device types by dividing various M2M devices according to the class, application type, etc. of the M2M devices.

Hereinafter, the method of distinguishing, by the base station, an HTC device from an M2M device according to a message based separation method, not a method of allocating separate ranging resources to the HTC device and the M2M device, will be described.

2. Method of Distinguishing an M2M Device from an HTC Device on the Basis of a Message As another method for distinguishing an M2M device from an HTC device, the HTC device and the M2M device share the same ranging resources, but the base station distinguishes the M2M device from the HTC device by an MAC message which is transmitted later.

To this end, the M2M device may include a bitmap field (e.g., 1 bit), which indicates that this is an M2M device, in, for example, an RNG-REQ message, SBC-REQ message or REG-REQ message. Then the processor 170 of the base station may recognize whether the M2M device or the HTC device has transmitted the received RNG-REQ message, SBC-REQ message or REG-REQ message, by decoding the bitmap field, which indicates that this is an M2M device, which is included in the received RNG-REQ message, SBC-REQ message or REG-REQ message. To this end, reserved bits or additionally allocated bits may be utilized to the predefined RNG-REQ message, SBC-REQ message or REG-REQ message. Likewise, the M2M device and the HTC device may share the device type between the base station and the device by including the bitmap field indicating the device type in the MAC message and transmitting the message.

As described above, the M2M device may request specific M2M requirements and/or features for the usage type or application type. For example, in the case of an M2M application such as a metering type, features/requirements of the time-controlled operation, in which data is transmitted through only specific time, may be applied, and in the case of an M2M application such as a sensor, features/requirements such as extremely low power consumption may be applied. Likewise, different features/requirements may be applied according to the application of each M2M device, and procedural or structural enhancement of the physical layer/MAC layer may be applied for each feature and requirement.

To this end, in the case of M2M devices, the negotiation for M2M features, which is required separately from the network entry process and capability negotiation process of the existing HTC devices, may need to be performed. Hereinafter, requirements/features capability negotiation, which is needed for M2M devices, will be described.

<Capability Negotiation Method of Features/Requirements of M2M Devices>

The present invention suggests a signaling method for negotiating whether to apply specific M2M features/requirements with the base station by mapping with some bits (e.g., 1 bit) for each of the M2M requirements and/or M2M features by the M2M device.

That is, in the case of M2M devices of IEEE 802.16 system, which is an example of a mobile communication system, a request message for M2M features/requirements may be transmitted to the base station through the bitmap field composed of M bits with 1 bit for each M2M features/requirements of a predetermined number (M) according to the application type. In response thereto, the base station may transmit, to the M2M device, the response message to M2M features/requirements, which may be supported, in a bitmap method or using ACK/NACK signal. Further, the M2M device may request the table form instead of the bitmap form (e.g., the M2M features/requirements, which may be supported in the table for each mode, are preset between the base station and the M2M device.) to the base station.

Alternatively, the base station may notify M2M devices of M2M features and requirements, which may be supported by the base station itself, in advance. Then the M2M device may request its desired M2M features/requirements to the base station on the basis of the received, supportable M2M features/requirements. To this end, an M2M features request message and an M2M features response message may be newly defined between the M2M device and the base station, and the message may be additionally transmitted and received between the M2M device and the base station in the network entry and capability negotiation of the M2M device. Of course, the newly defined expressions such as M2M features request message and M2M features response message are just an example, and may be called by other expressions.

As a method for capability negotiation for features/requirements of other M2M devices, the M2M device and the base station may negotiate M2M features and requirements through the reserved field of the existing RNG-REQ/RSP message, SBC-REQ/RSP message, or REG-REQ/RSP message, or the additionally allocated bits.

As another method, the M2M device may separate the transmission time point of signals, which request M2M features and requirements so as to be transmitted. That is, among M2M features and requirements, the bitmap field, which is related with the security related M2M feature activation, may be negotiated through the SBC-REQ/RSP message between the M2M device and the base station, the grouping-related M2M feature may be negotiated through the RNG-REQ/RSP message, and other M2M features may be negotiated through the REG-REQ/RSP message. Likewise, the negotiation process on various M2M features may be separately performed through different MAC management messages.

Alternatively, all M2M features and requirements, which may be supported by the base station, may be supported to M2M devices without such a negotiation process for M2M features and requirements. Further, the capability negotiation process for M2M features and requirements may be extended to the capability negotiation process for M2M features and requirements according to the device class of M2M devices (for example, the device classes distinguished according to the application type). That is, after M2M features and requirements, which are supported for each device class of M2M devices, are set in advance, if the M2M devices notify the base station of their device classes, the base station provides support. At this time, the class information of the M2M device, which may be supported by the base station itself, may be notified to the M2M devices in advance.

As another method, as mentioned above, the base station may newly define system information for only M2M devices, and may transmit M2M features and requirements, which may be supported by the base station itself, to the M2M devices through the newly defined system information. Then the M2M devices may set the required M2M features and requirements and transmit the features and requirements to the base station through the above described signaling method on the basis of the newly defined system information received from the base station. In this case, the base station may transmit a simple response message in the form of an acknowledgement on the request, or may set M2M features and requirements to be supported again, and transmit the features and requirements.

The method of negotiating, by the M2M device, M2M features and requirements with the base station with the initial network entry. There may be M2M devices with mobility among many M2M devices, and M2M devices mounted on a vehicle may be such an example. The M2M device, which is mounted on a vehicle, may need to perform handover between cells because movement between cells is possible. Hereinafter, a method of performing communication with the base station in the case in which an M2M device with mobility performs handover along with its movement will be described. In particular, in the present invention, a method of renegotiating M2M features and requirements in the target base station for the handover M2M device in the process of performing handover is suggested.

<Method of Renegotiating M2M Features of Handover M2M Devices>

First, a process of performing a handover procedure by an HTC device (e.g., a mobile station) in IEEE 802.16 system, which is an example of a mobile communication system, will be briefly described.

Figure 3:
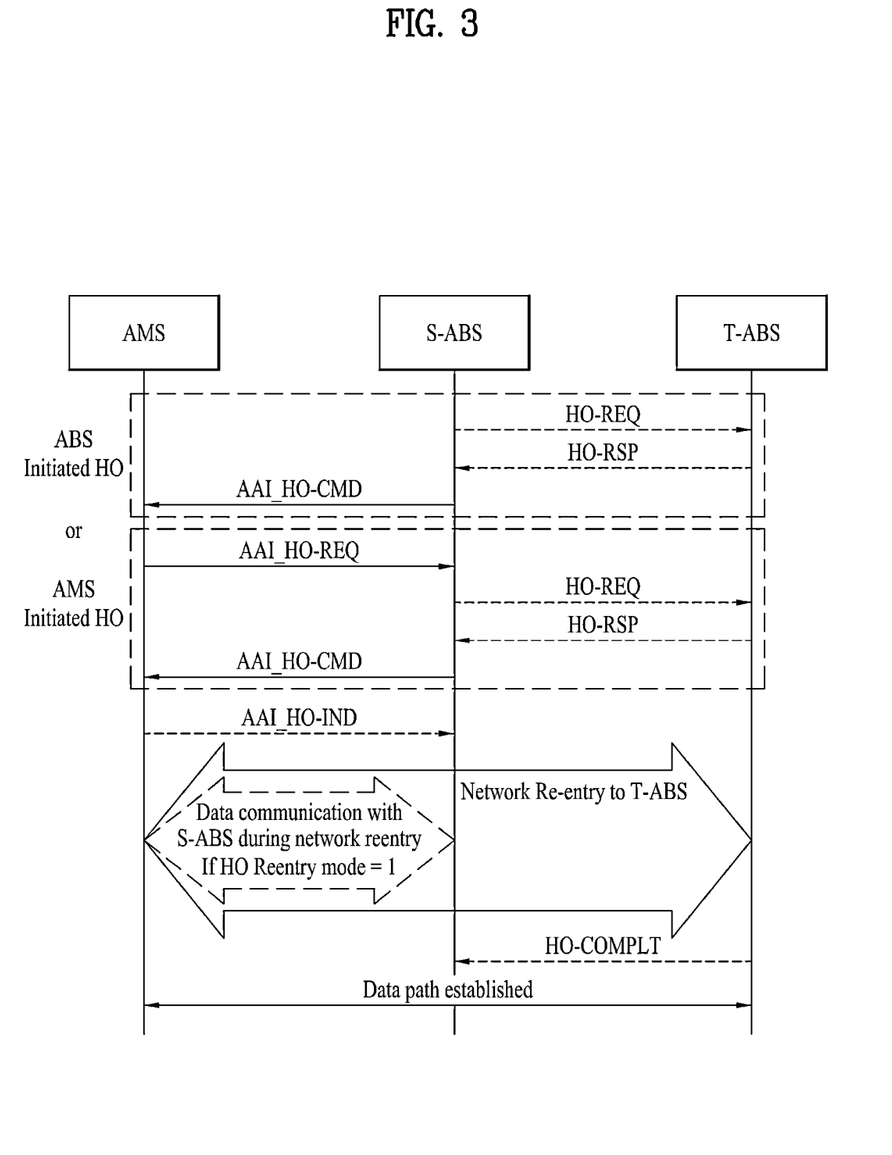
FIG. 3 illustrates a process of performing, by a HTC device, a general handover procedure.

FIG. 3 illustrates a process of performing, by a HTC device, a general handover procedure.

Referring to FIG. 3, the handover procedure may be started by a HTC device or a serving advanced base station (S-ABS) (or may also be referred to as "SBS", etc.). However, in both cases, the handover request message (e.g., HO-REQ message) and the handover response message (e.g., HO-RSP message) may be exchanged through the backbone network between the serving base station and the target advanced base station (T-ABS) (or may also be referred to as "TBS", etc.). Likewise, at the time of handover of the HTC device, various traffics such as information on the HTC device context or information on data forwarding may be exchanged in advance through the backbone network between the serving base station and the target base station.

Figure 4:
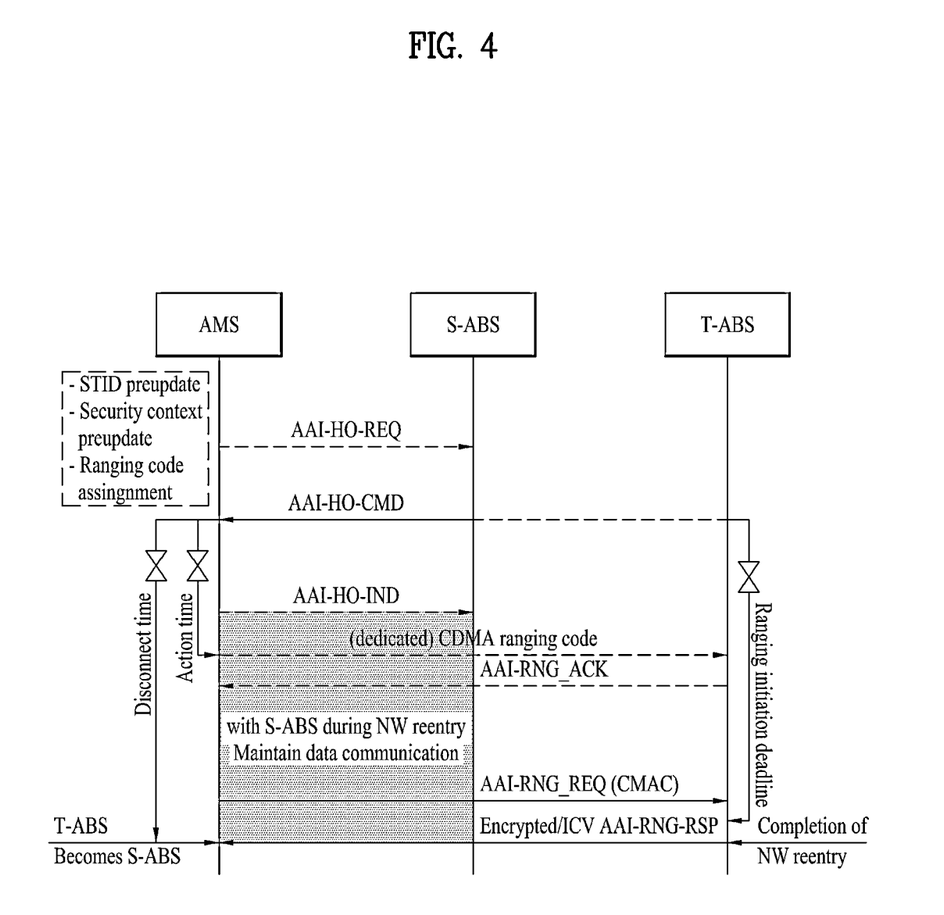
FIGS. 4 and 5 respectively illustrate a process of a network reentry in a target base station at the time of handover of a HTC device in IEEE 802.16m system which is an example of a mobile communication system.
Figure 5:
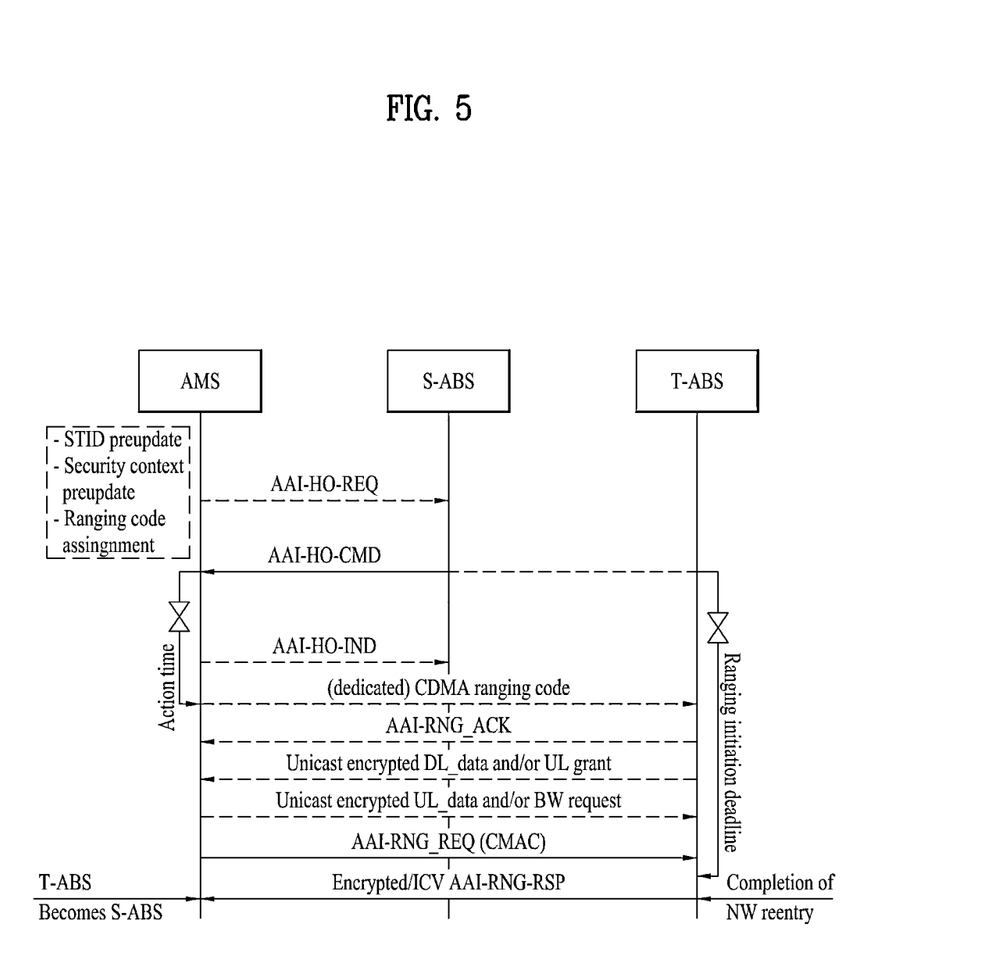

FIGS. 4 and 5 respectively illustrate a process of a network reentry in a target base station at the time of handover of a HTC device in IEEE 802.16m system which is an example of a mobile communication system.

The handover process is a case in which HO_Reentry_Mode parameter has been set to 1, and the HTC device performs network reentry to the target base station while continually communicating with the serving base station in the action time at the time of the network reentry (i.e., handover). Thereafter, the HTC device may transmit the (dedicated) CDMA ranging code to the target base station, and the target base station may transmit the AAI-RNG-ACK (or AAI-RNG-RSP) message to the HTC device as an acknowledgement. However, the HTC device stops communication with the serving base station after completion of the network reentry to the target base station. Further, the HTC device does not exchange data with the target base station before completion of the network reentry. The handover interruption time in the process of the handover procedure illustrated in FIG. 4 is expected to be about 25 ms.

Thereafter, the handover process illustrated in FIG. 5 is a case in which HO Reentry Mode parameter has been set to 0. Such a handover process is different from that of FIG. 4 in that the HTC device performs a network reentry to the target (advanced) base station (T-ABS) while not performing communication with the serving (advanced) base station (S-ABS) in the action time at the time of the network reentry (i.e., handover). However, even in such a case, the handover interruption time is expected to be about 25 ms as in FIG. 4. Further, as in FIG. 4, the HTC device may transmit (dedicated) CDMA ranging code to the target base station, and as a response thereto, the target base station may transmit an AAI-RNG-ACK (or AAI-RNG-RSP) message to the HTC device.

FIGS. 3 to 5 illustrate that the mobile station (AMS), which is the HTC, performs communication with the serving base station and the target base station, but the M2M device may also perform a process for a network entry and network reentry through the process illustrated in FIGS. 3 to 5 as in the mobile station. However, in the case of some processes, the M2M device may communicate with the serving base station and the target base station through a newly defined message type.

As illustrated in FIGS. 3 to 5, the following method may be used for negotiation for M2M features and requirements in the process of a network reentry of the M2M device to the target base station at the handover situation.

Method 1 for Negotiating M2M Features and Requirements During a Network Reentry

The M2M device, which performs handover, may transmit a request message on M2M features and requirements to the serving base station in advance. The M2M device may transmit the request message on M2M features and requirements to the serving base station in the form of a newly defined MAC management message, or may transmit the message through the handover request message (e.g., AAI-HO-REQ message). The serving base station may transmit the request message on M2M features and requirements to the target base station through the backbone network in the form of a HO-REQ message. Then the target base station may transmit, to the serving base station, information on M2M features and requirements, which may be supported by the target base station itself, through the backbone again in the form of, for example, HO-RSP message.

Likewise, the serving base station, which receives information on supportable M2M features and requirements (the information may include information on whether M2M features required by the M2M device may be supported) as a feedback from the target base station, may inform the M2M device of the information through the handover message (e.g., AAI-HO-CMD message) or the newly defined MAC management message.

Method 2 for Negotiating M2M Features and Requirements During a Network Reentry

The serving base station may include the information field indicating whether the handover device is an M2M device or a HTC device in the HO-REQ message, which is an example of a message transmitted to the target base station through the backbone network, and transmit the message. In the case in which the handover device is an M2M device type, the target base station may notify the serving base station of the information on M2M features and requirements, which may be supported by the target base station, through the HO-RSP message, which is an example of a message transmitted through the backbone network, in the form of an above mentioned bitmap method or table method.

Based thereon, the serving base station may transmit, to the M2M devices, information on M2M features and requirements, which may be supported by the target base station, through the handover command message (e.g., AAI-HO-CMD message) or through the newly defined MAC management message in a bitmap method or table method.

In this case, the handover M2M device may set required M2M features and requirements and transmit the features and requirements to the serving base station through, for example, the AAI-HO-IND message, and the serving base station, which receives the features and requirements, may transmit the information to the target base station through the backbone network. On the other hand, after performing handover to the target base station, the M2M device may perform direct transmission to the target base station through the ranging request message (e.g., AAI-RNG-REQ) or the newly defined MAC management massage. In response to the request of M2M features and requirements of the M2M device, target base station may transmit a response message to the M2M device in a simple acknowledgement form, or may newly form supportable M2M features, include the features in the ranging response message (e.g., AAI-RNG-RSP), and transmit the message to the M2M device or may transmit the response message in the form of a newly defined MAC management message.

Method 3 for Negotiating M2M Features and Requirements During a Network Reentry

After the handover M2M device performs handover to the target base station, the M2M feature negotiation with the target base station may be performed again. To this end, the M2M device may perform handover to the target base station, and then request specific M2M features through the ranging request message (e.g., AAI-RNG-REQ message) or through a newly defined MAC management message in a bitmap method or table method. The target base station may transmit a response thereto to the M2M device through the ranging request message (e.g., AAI-RNG-REQ message) or through the newly defined MAC management message.

Further, the serving base station may newly define the system information for M2M devices, and may transmit, to the M2M device, information on M2M features which may be supported to the newly defined system information. Then after the M2M device performs handover to the target base station, the M2M device may receive M2M system information from the target base station, and transmit the request message on the M2M features based thereon.

Method 4 for Negotiating M2M Features and Requirements During a Network Reentry

Before the M2M device performs handover, the serving base station may notify the M2M devices of information on M2M features and requirements, which are supported by neighbor cells, through the AAI-NBR-ADV message, which is a neighbor base station (or cell) advertisement message, in a bitmap method or table method. In this case, when performing actual handover, the M2M device may set a required feature among M2M features, which are supported by the target base station, and transmit the feature to the serving base station through the message (e.g., AAI-HO-REQ message), which requests handover to the serving base station on the basis of the received AAI-NBR-ADV message, or through the AAI-HO-IND message. Then the serving base station may forward the requested information on the M2M features to the target base station through the backbone network, or after performance of handover, the M2M device may be set to transmit, to the target base station, the requested information on the M2M features through the ranging request message (e.g., AAI-RNG-REQ message) or a new MAC management message. The target base station may transmit a response signal to the M2M device through the ranging response message (e.g., AAI-RNG-REQ message) or a new MAC management message on the basis of the requested M2M feature information.

<Definition of a New MAC Management Message for the Update and Reconfiguration of M2M Features and Requirements>

As described above, the M2M features and requirements may be set through negotiation between the base station and the M2M device in the initial network entry process of the M2M device or a network reentry process such as handover. However, whether to support each M2M feature and requirement may be dynamically or semi-statically changed even between the already connected base station and M2M device, depending on the network situation. The present invention suggests a new MAC management message used for reconfiguration by the update, change, etc. of M2M features and requirements.

A new MAC management message used for reconfiguration by the update, change, etc. of M2M features and requirements may be defined as, for example, "M2M features reconfiguration message", but may also be called in various other forms. The M2M device (or base station) may transmit a message, which requests reconfiguration of M2M features, to the base station (or M2M device), and in response thereto, the base station (or M2M device) may transmit a reconfiguration response message of the M2M features to the M2M device (or base station).

Further, the update on the M2M features may be performed in a semi-static method through the M2M system information. Based thereon, M2M features, which are supported between the M2M device and the base station, may be set again through the M2M features reconfiguration message.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

The method of performing communication by a machine to machine (M2M) device during a network entry or network reentry may be industrially applicable to various communication systems such as IEEE 802.16, 3GPP LTE, LTE-A, etc.

The invention claimed is:

1. A method for performing communication by a machine to machine (M2M) device during a network entry, the method comprising:
   receiving, by the M2M device from a base station, information on an M2M dedicated ranging resource assigned for an application type of the M2M device,
   wherein the information on the M2M dedicated ranging resource assigned for the application type of the M2M device includes a cyclic shift offset value of a seed sequence used in generating a ranging code assigned to a human type communication (HTC) device, and
   wherein the cyclic shift offset value of the seed sequence is different from that of different application type of other M2M device;
   acquiring the M2M dedicated ranging resource based on the cyclic shift offset value of the seed sequence used in generating the ranging code assigned to the HTC device; and
   transmitting, by the M2M device, a signal to a base station through the acquired M2M dedicated ranging resource assigned for the application type of the M2M device.

2. The method according to claim 1, wherein the information on the M2M dedicated ranging resource further includes a time offset value and a frequency offset value of the M2M dedicated ranging resource relative to the ranging resource assigned to the HTC device.

3. The method according to claim 1, further comprising:
   transmitting a first message including information of requesting support of M2M features or M2M requirements according to the application type of the M2M device; and
   receiving a second message including information on the M2M features or M2M requirements according to the application type of the M2M device, which may be supported by the base station, as a response to the first message.

4. The method according to claim 1, further comprising:
   receiving, from a base station, M2M dedicated system information including information on M2M features or M2M requirements according to the application type of an M2M device, which may be supported by the base station; and
   transmitting, to the base station, information on M2M features or M2M requirements requested by the M2M device based on the M2M dedicated system information.

5. A machine to machine (M2M) device for performing communication during a network entry, the M2M device comprising:
   a receiver configured to receive, by the M2M device from a base station, information on an M2M dedicated ranging resource assigned for an application type of the M2M device,
   wherein the information on the M2M dedicated ranging resource assigned for the application type of the M2M device includes a cyclic shift offset value of a seed sequence used in generating a ranging code assigned to a human type communication (HTC) device, and
   wherein the cyclic shift offset value of the seed sequence is different from that of different application type of other M2M device;
   a processor configured to acquire the M2M dedicated ranging resource based on the cyclic shift offset value of the seed sequence used in generating the ranging code assigned to the HTC device; and
   a transmitter configured to transmit a signal to a base station through the acquired M2M dedicated ranging resource assigned for the application type of the M2M device.

6. The M2M device according to claim 5, wherein the transmitter is further configured to transmit a first message including information of requesting support of M2M features or M2M requirements according to the application type of the M2M device, and the receiver further is configured to receive a second message including information on the M2M features or M2M requirements according to the application type of the M2M device, which may be supported by the base station, as a response to the first message.

7. The M2M device according to claim 5, wherein the receiver configured to receive, from a base station, M2M dedicated system information including information on M2M features or M2M requirements according to the application type of an M2M device, which may be supported by the base station, and the transmitter configured to transmit, to the base station, information on M2M features or M2M requirements requested by the M2M device based on the M2M dedicated system information.

* * * * *